MAGNETIC CORE MATRIX

Original Filed June 25, 1957 9 Sheets-Sheet 1

MATRIX FOR BINARY ADDITION

INVENTOR
MUNRO KING HAYNES
BY John A. Hall
ATTORNEY

MAGNETIC CORE MATRIX

Original Filed June 25, 1957 9 Sheets-Sheet 2

MAGNETIC CORE MATRIX

Original Filed June 25, 1957 9 Sheets-Sheet 3

MAGNETIC CORE MATRIX

Original Filed June 25, 1957 9 Sheets-Sheet 4

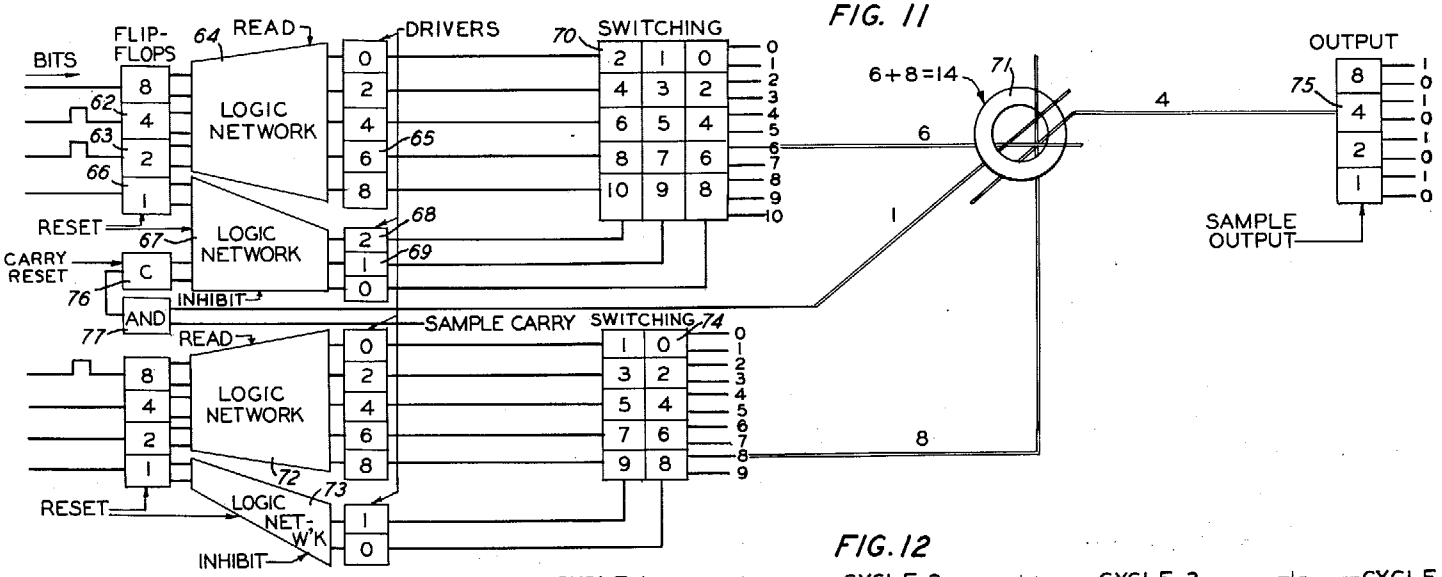

FIG. 11

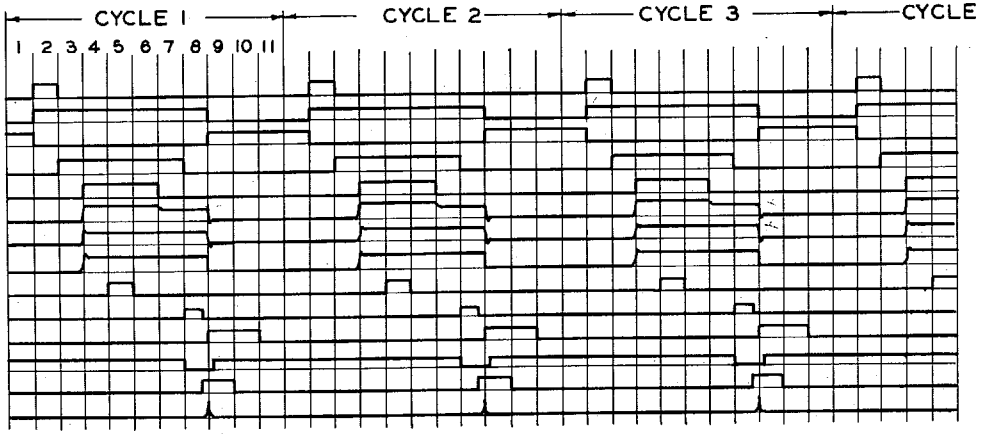

FIG. 12

INCOMING CODE BITS ENTRY TIME
FLIP FLOP TRIGGERED 1
FLIP FLOP TRIGGERED 0
INHIBIT PULSE
READ PULSE
STATE OF SWITCHING CORE SELECTED
STATE OF COMPUTING CORE OPERATED
OPERATION OF OUTPUT FLIP FLOP
READ OUTPUT—SAMPLE
RESET CARRY
RESET FLIP FLOPS ETC
CARRY FLIP FLOP- UP IF PREVIOUSLY OPERATED
SAMPLE CARRY
AND CCT. TO CARRY FLIP FLOP

MAGNETIC CORE MATRIX

Original Filed June 25, 1957 9 Sheets-Sheet 6

MAGNETIC CORE MATRIX

Original Filed June 25, 1957 9 Sheets-Sheet 7

MAGNETIC CORE MATRIX

Original Filed June 25, 1957 9 Sheets-Sheet 8

MAGNETIC CORE MATRIX

Original Filed June 25, 1957 9 Sheets-Sheet 9

United States Patent Office

Re. 25,340
Reissued Feb. 26, 1963

25,340

MAGNETIC CORE MATRIX

Munro King Haynes, Chappaqua, N.Y., assignor to International Business Machines Corporation, New York, N.Y., a corporation of New York Original No. 3,001,710, dated Sept. 26, 1961, Ser. No. 667,837, June 25, 1957. Application for reissue Aug. 14, 1962, Ser. No. 218,209
19 Claims. (Cl. 235—160)

Matter enclosed in heavy brackets [ ] appears in the original patent but forms no part of this reissue specification; matter printed in italics indicates the additions made by reissue.

This invention relates to data handling devices and particularly to the use of magnetic binaries arranged in a matrix and employed to perform various arithmetical operations with a plurality of factors expressed in code.

The object of the invention is to provide a matrix of magnetic cores coordinately arranged and having output windings interlaced therewith in various patterns corresponding to the arithmetical operation to be performed.

Another object is to provide a magnetic core adder that is adaptable for use with various computers, accounting and business machines to perform logic and one that is sufficiently rapid in operation for reliable use with existing machines of that nature.

Fundamentally the essential and principal component of the present device is a coordinately arranged collection of magnetic binaries having an input circuit for each digit of a first factor threaded through the binaries of a corresponding row in one coordinate direction and an input circuit for each digit of a second factor threaded through the cores of a corresponding row in another coordinate direction.

It is to be particularly noted that the number of rows in each coordinate direction will correspond to the base of the system of arithmetic used. Thus computation in binary arithmetic will require two horizontal rows and two vertical rows, computation in decimal arithmetic will require ten horizontal rows and ten vertical rows, computation in duo-decimal arithmetic will require twelve horizontal rows and twelve vertical rows and so on.

Each magnetic binary has one or more single digit output circuits threaded therethrough in accordance with the code in which the numbers of the system are expressed and those binaries which will correspond to greater than single results will also have carry output circuits threaded therethrough.

It will be shown hereinafter how the sum of 96 and 38 is derived, by first summing the units digits, recording the units digit of the sum, then recording the carry, mixing it with the tens digits 9 and 3, summing the 9, the 3 and the carry, recording the units digit thereof as the tens digit of the result, recording the carry therefrom and finally recording this carry as the hundreds digit of the result, which will appear to be 134. This, it will be understood, is my way of example, since numbers expressed by large numbers of digits may with equal facility be summed and the result will be computed and recorded digit by digit starting with the units digit.

It will appear hereinafter that the inputs expressed in code are translated into their decimal equivalents and the computation is made on a decimal basis or on a coded basis. In the latter case, some of the binaries will have but a single output wire threaded therethrough since there is but a single bit in the code for expressing their decimal value whereas others may have two or more output circuits threaded therethrough since there may be two or more bits in the code for expressing their decimal values.

The computing matrix consists of a horizontal and a vertical array of bistable magnetic cores, one of which is changed from its normal binary 0 state to its binary 1 state on the coincidence of a signal on each of the horizontal and vertical circuits threaded therethrough. Each such binary has an output circuit threaded therethrough which emits an effective output signal during the transition thereof from its binary 0 to its binary 1 state. The signal later emitted over this output circuit during the transition thereof from its binary 1 state to its binary 0 state as the core is being reset, being in the opposite direction, is ineffective. Each such core may also have threaded therethrough, a carry circuit, poled oppositely to the said output circuit so that as the core is being set to its binary 1 state the signal thereby produced in the carry circuit will be ineffective. However, since the core will almost immediately be reset to its binary 0 state, the signal thereby produced in the carry circuit will be effective.

Thus it will appear that a cycle consists of a double step during the first half of which a binary is selectively set and thereby emits an output signal and during the second half of which the binary is restored and thereby emits a carry signal. Therefore, when the next code is received there may or there may not be a carry signal awaiting to be added in on the new code.

It will be observed that in accordance with the manner in which the output conductors are threaded through a binary that (a) an output signal may be obtained in all sense output lines when the core is switched from the "0" to the "1" state, or (b) an output signal may be obtained in some of the sense output lines when the core switches to the "1" state and an output obtained in the remaining sense output lines upon resetting the core from the "1" to the "0" state, or (c) an output signal may be obtained in all of the sense output lines when resetting the core from the "1" to the "0" state. In other words, when a magnetic binary is driven from one state of remanence to the other a significant pulse will be induced in an output circuit threaded therethrough and by proper poling of such output conductor or conductors the output pulses may be selectively obtained.

It will further be obvious that when an output conductor is threaded through a binary, an output pulse in one direction will be obtained when the binary is driven from "0" to "1" and an output pulse in the opposite direction will be obtained when the binary is reset from "1" to "0." By leading such an output circuit to the grid of a tube the positive one of these two output pulses may be used and the other may be ignored.

Fundamentally therefore, the operation of this arithmetic unit resides in the use of a matrix of magnetic binaries having bipolar output windings whereby any two digit result represented by the selective operation of any one thereof may be transmitted in two steps separated in time, first the lower order digit of such result and thereafter the higher order digit of such result. This means, by way of example, that where by coincidence of a signal on a horizontal value 6 circuit and a vertical value 8 circuit, a value 14 binary (in a summing matrix) will first be driven from its binary 0 state to its binary 1 state and will thereby transmit an output value 4 signal and then will be driven from its binary 1 to its binary 0 state and will thereby transmit a carry output value 1 signal.

In the same manner, where this matrix is being used as a multiplying matrix, the binary at the intersection of the horizontal value 6 circuit and the vertical value 8 circuit will express a value 48 and will first be driven from its binary 0 state to its binary 1 state and will thereby transmit an output value 8 signal and will secondly thereafter be driven from its binary 1 state to its binary 0 state and will thereby transmit a carry output value 4 signal, whereby the result 48 may be stored for routine handling in an overall multiplication operation.

A feature of the invention is a matrix for switching magnetic binaries for each factor input in which the incoming bits of a factor are divided into two groups, one of said groups deriving a first coordinate signal and the other of said groups eanbling a row of binaries in the other coordinate direction by inhibiting all the binaries of said matrix excepting those in the said enabled row. The first coordinate signal is thereby effective to operate a single binary to a change in state and this change in state produces one of the two coincident signals to the principal computing matrix. Thereafter, through the circuits of this inhibiting network a general rest signal is transmitted to all the binaries of said switching matrix which will have the effect of restoring the said operated binary, that is, it will drive this selectively operated binary back to its normal state and thus provide a reverse current as one of the two coincident signals for restoration of the operated binary in the said principal computing matrix.

Another feature of the invention is a means for translating a code for expressing decimal digits by a plurality of different value binary bits into a single signal on one of ten decimally valued output circuits. In accordance with this feature, the bits always incoming simultaneously, are divided into two groups which then pass through two logical circuit networks to produce certain intermediate results and these results are then passed through a matrix of magnetic binaries to produce a single combinational result. The above said matrix of magnetic binaries is coordinately arranged and has one row in a first coordinate direction for each possible output of said logical circuit network responsive to the first of said groups and one row in a second coordinate direction for each possible output of said logical circuit network responsive to said second of said groups. The output circuits for said second group are arranged to inhibit the operation of all binaries of said matrix with the exception of those in a single one of said second group rows, whereupon an operating signal is transmitted over one of the said first group logical circuit network outputs whereby a single one of said binaries of said matrix will become operated, this one being characterized by and representing the decimal equivalent of the said code.

Specifically, by way of example, where the demical digits are expressed in the code represented by the values 8, 4, 2 and 1, that is the fourth, third, second and first order binary digits, commonly known as the 8 bit, the 4 bit, the 2 bit and the 1 bit, the 8, 4 and 2 bits are passed through a logical circuit network and translated into one of five outputs valued 0, 2, 4, 6 and 8 respectively. Likewise the 1 bit is passed through a logical circuit network and translated into one of two outputs valued 0 and 1 respectively. A matrix of magnetic binaries is provided having five rows in one direction for the said 0, 2, 4, 6 and 8 outputs and two rows in the other direction for the said 0 and 1 outputs. Of these, one row becomes inhibited so that whichever of the five rows in the other coordinate direction is selected there will be a single binary selected and operated. Thus the bits by which a decimal number is represented are combined through logical circuits to operate (that is, to drive from one to another state) a magnetic binary. This binary controls an output circuit characterized by a corresponding decimal value.

Further, in accordance with this feature, a carry may be mixed in with the logical circuits of the 1 bit and since the addition of input bits on two inputs may produce a 0, a 1 or a 2, then the matrix of binaries in this case will include three rows in the second coordinate direction and two of these rows will be inhibited.

Another feature of the invention is a means for selecting and operating a single magnetic binary in a coordinately arranged matrix of magnetic binaries having two sets of input wires threading the rows thereof in each of two coordinate directions, means being provided to pulse all the binaries in one row in one coordinate direction with a pulse of sufficient strength to change the state thereof while placing an inhibiting force on all rows in the other coordinate direction excepting that row containing the binary selected for operation.

Another feature of the invention is the use of a redundancy bit output conductor threaded through certain binaries of the computing matrix. Each binary has threaded therethrough a plurality of code bit output circuits in two groups, one for transmitting output code bits upon the operation of the binary from its normal to its operated state and another for transmitting output code bits upon the restoration of the binary from its operated to its normal state. Where the coding is such that an extra or redundancy bit is needed or added to a code containing an even number of bits in order that the codes used shall always have an odd number of code bits, then a redundancy bit output conductor is included among the conductors threaded through the binary. By way of example, in a multiplying matrix, a binary representing the product 15 will have 1, 4 and R (redundancy) bit outputs for its units output digit 5 and a 1 bit output for its tens digit 1 output, a binary representing the product 72 will have a 2 bit output for its units output digit 2 and 1, 2 and 4 bit outputs for its tens digit 7 output and again a binary representing the product 2 (that is 02) will have a 2 bit output for its units output digit 2 and an R (redundancy) bit output for its tens output digit 0.

It will be obvious that provision may be made for even redundancy bit transmission as well as odd redundancy bit transmission.

Another feature of the invention is a comparative value output means. Where the binaries of a computing matrix are operated by the coincidence of two coordinately arranged signals derived from two factors, it may be desired to know the comparative values of the inputs and therefore three output signal conductors may be threaded through the binaries of the matrix, one denoting that $H>V$ (the value of the input in the horizontal coordinate direction is greater than the value of the input in the vertical coordinate direction), another denoting that $H=V$ and a third denoting that $H<V$. The manner in which these out signal conductors are used [in] *is* conventional and forms no part of the present invention, but the provision of such output conductors is one of the features hereof.

Another feature of the invention is the use of a special magnetic binary in the computing matrix which acts only to emit a carry. It will be noted that when a decimal summing matrix is being employed there is one special situation which must be met, that is, where the input digit is 9 and to which a carry must be added. This means that the 0 input conductor to the matrix must be used to produce coincidence in some one of the binaries in this 0 row but since none of the binaries in that row will produce a carry, since the highest valued sum is $0+9=9$, an extra and special binary is provided for the purpose of creating a carry. Therefore, the 0 row of binaries includes ten binaries valued 0 to 9 inclusive and an eleventh valued 10. Again, since this eleventh binary has no other input so that it cannot be operated by coincidence, it is provided with extra turn so that the pulse traveling over the input conductor threaded through the other ten binaries of that row and which has a strength only sufficent for the coincident operation thereof, will be of sufficent strength in this eleventh binary to cause a change in state. The 0 row of binaries therefore has two inputs threaded therethrough, one of which valued at 0 traverses those binaries valued 0 to 9 inclusive and a second of which valued at 10 traverses not only those valued 0 to 9 but also that one valued at 10. Thus in the circuit which translates one of the incoming digits and mixes in to the result a carry there are two outputs one valued at 0 and the other valued at 10 and both of which thread the 0 row of binaries for coincident operation and only one of which threads the single binary valued 10 and whose sole purpose is to produce a carry.

In accordance with this feature, where the summing matrix is employed for decimal handling, the matrix includes 101 binaries arranged in 10 rows of 10 and having an extra binary in a 0 row provided with a double winding for operation by a single input signal.

A feature of the invention is a matrix of magnetic binaries which may be selectively operated, having bipolar output windings whereby a selected one of said magnetic binaries will produce and transmit two output signals, one on the operation thereof and another on the restoration thereof. By such means a given binary in summing array may separately transmit the units digit and thereafter the tens digit of a two digit sum. As pointed out hereinbefore and by way of example, a binary operated by the coincidence of a first factor value 6 signal and a second factor value 8 signal, will upon its operation transmit a units digit value 4 output signal and thereafter on its restoration a tens digit value 1 output signal.

It will also be obvious that by proper poling of the various outputs, the units and tens result digits may be pulsed simultaneously and not successively as above set forth so that the circuitry where the complete result is wanted immediately may be provided by simple poling of the output conductors as they are threaded through the binaries.

Likewise, when the matrix is being employed for multiplication, this same binary will, upon its operation transmit a units digit value 8 output signal and thereafter on its restoration a tens digit value 4 output signal.

Another feature of the invention is the use of a matrix of magnetic binaries in a coordinate array for column shift purposes where the input channels are represented by the matrix inputs in one coordinate direction and shifting is accomplished by pulsing the desired input in the other coordinate direction. Such a shift position control is an especially simple arrangement since the matrix may be tailored to any given number of input and output channels times the number of shift positions.

Other features will appear hereinafter.

The drawings consist of nine sheets having twenty-two figures, as follows.

Figure 8:
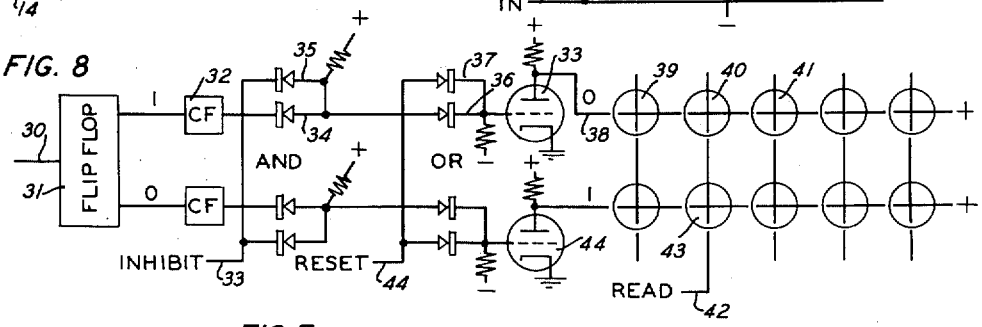
FIG. 8 is a schematic circuit diagram showing how the magnetic binaries of a matrix of switching cores may be controlled by inhibition.
Figure 9:
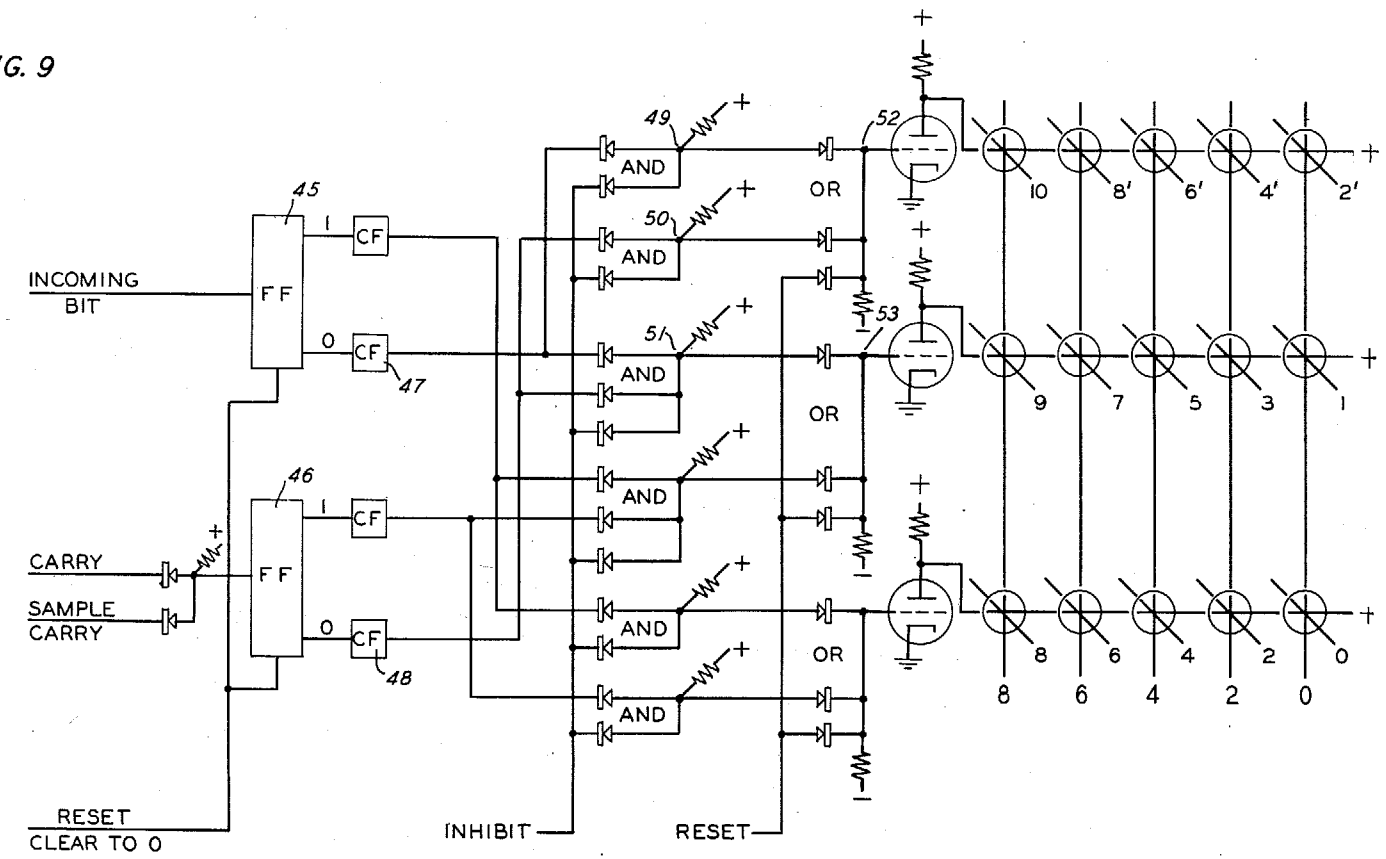
FIG. 9 is a schematic circuit diagram showing how the magnetic binaries of a matrix of switching cores may be controlled by inhibition as in FIG. 8 but enlarged to provide for an incoming carry as well as an incoming code bit.
Figure 10:
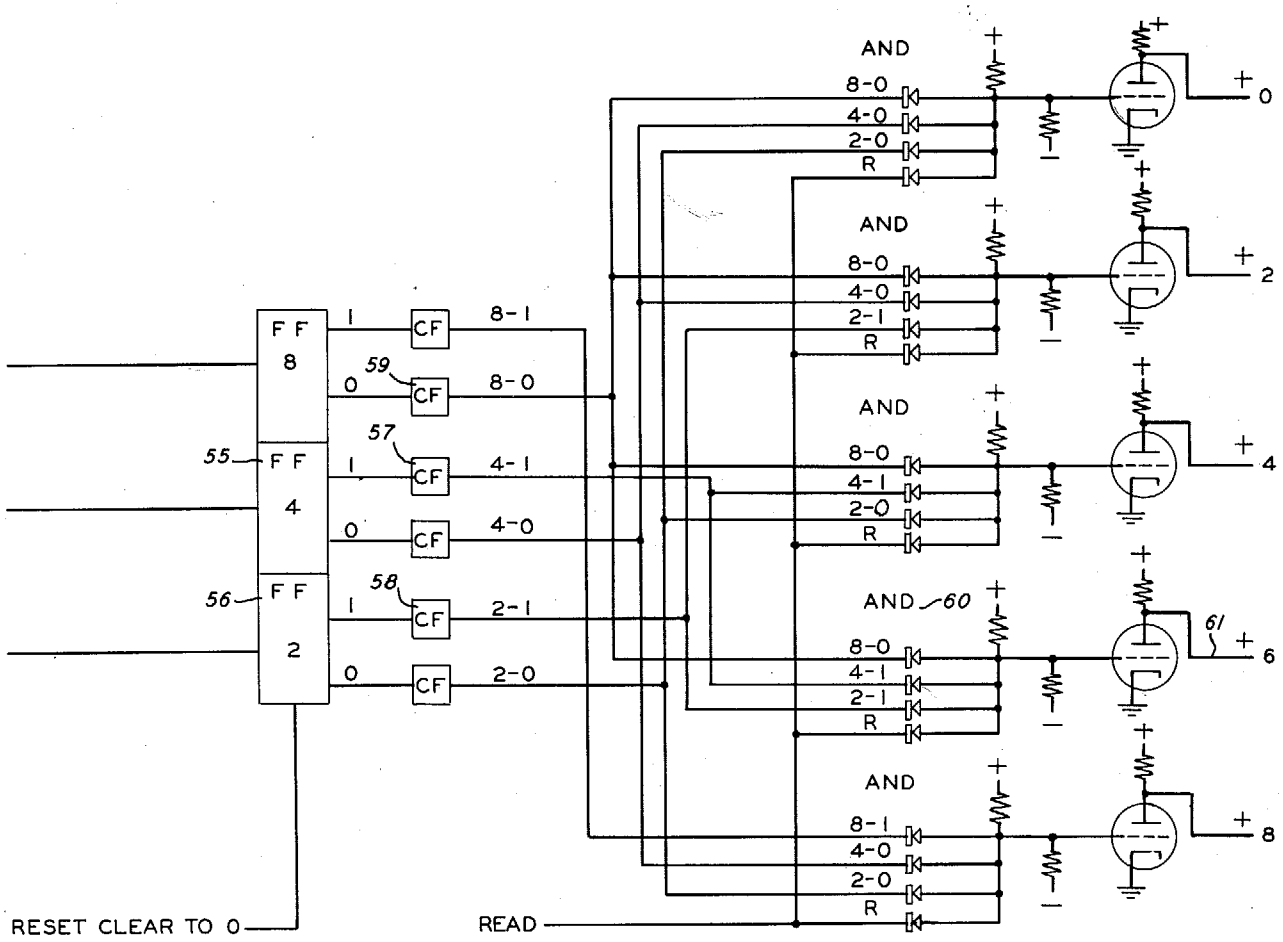
Figure 13:
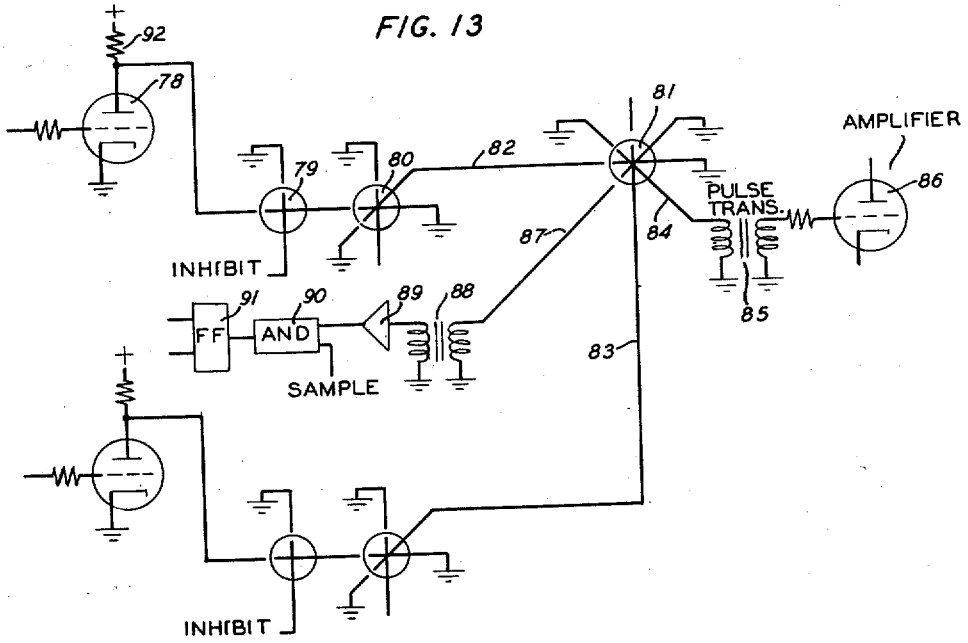
Figure 14:
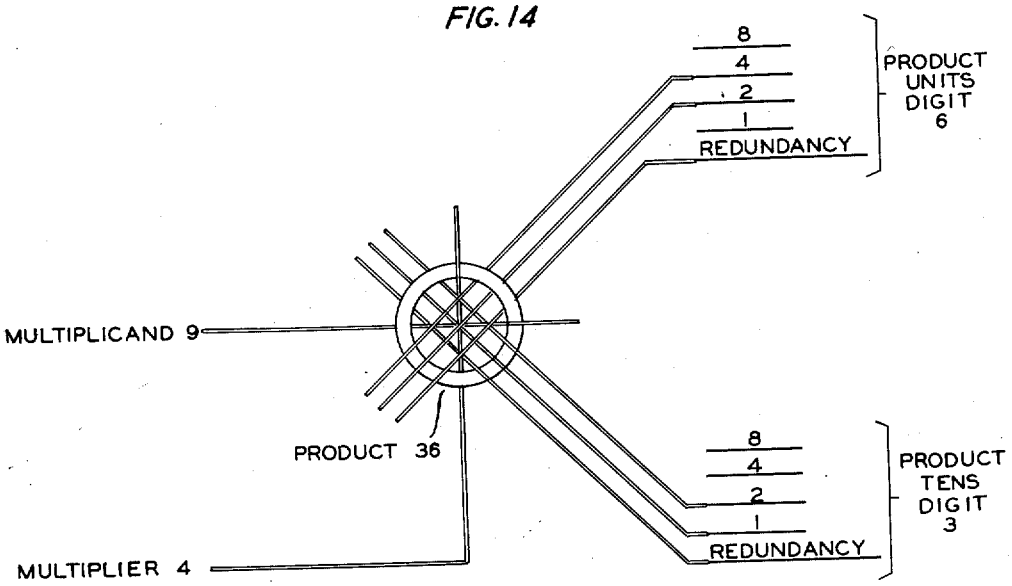
Figure 16:
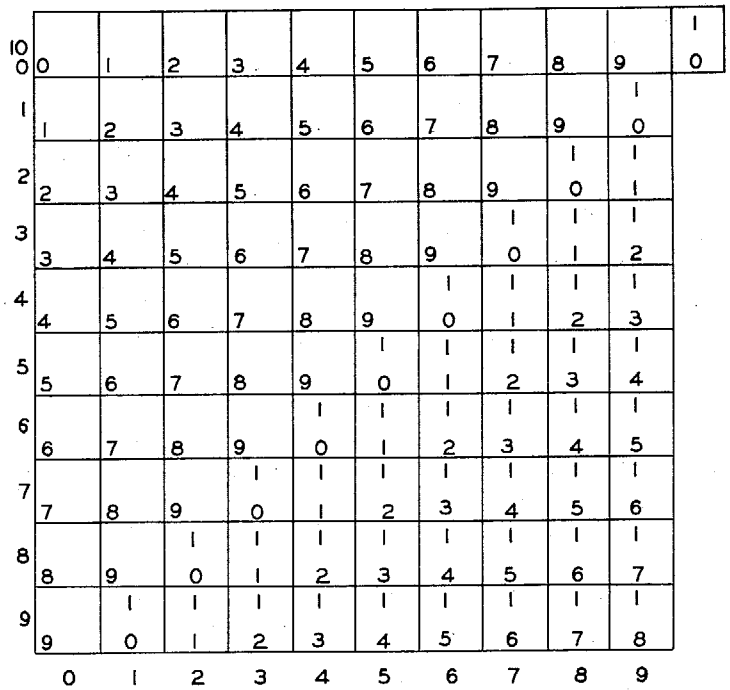
Figure 15:
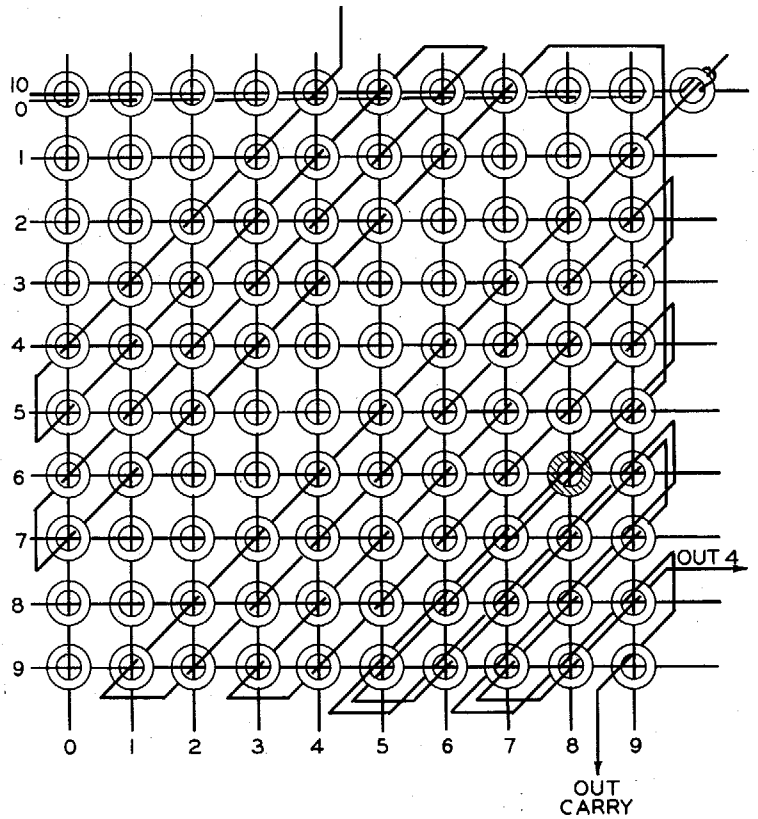
Figure 17:
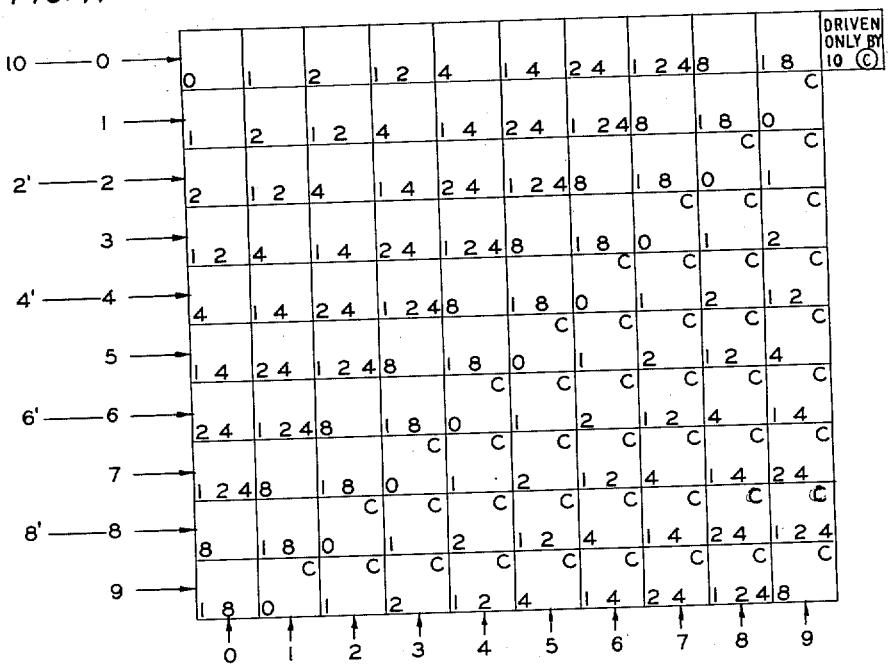
Figure 18:
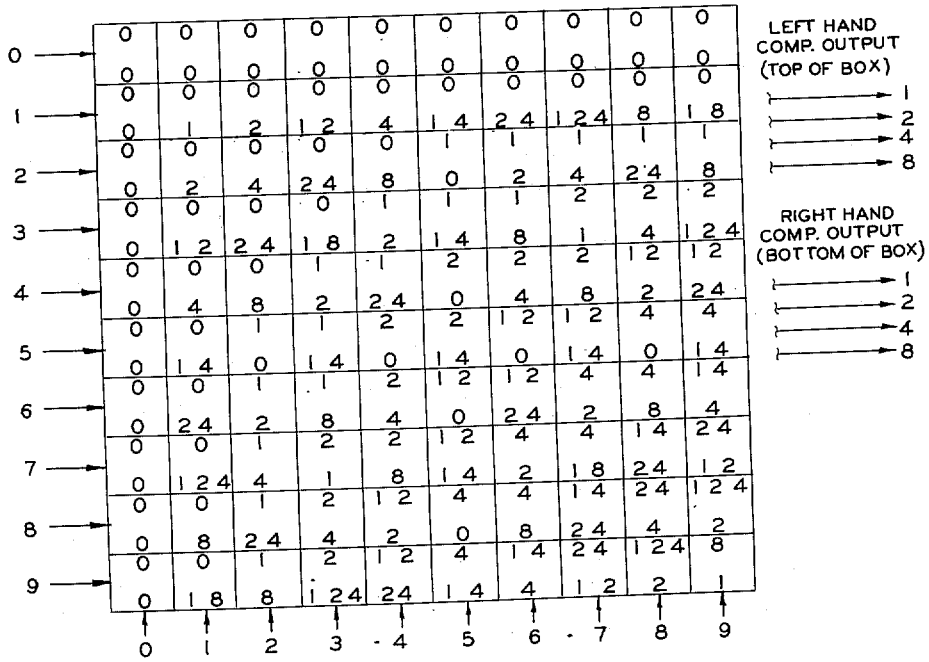
Figure 19:
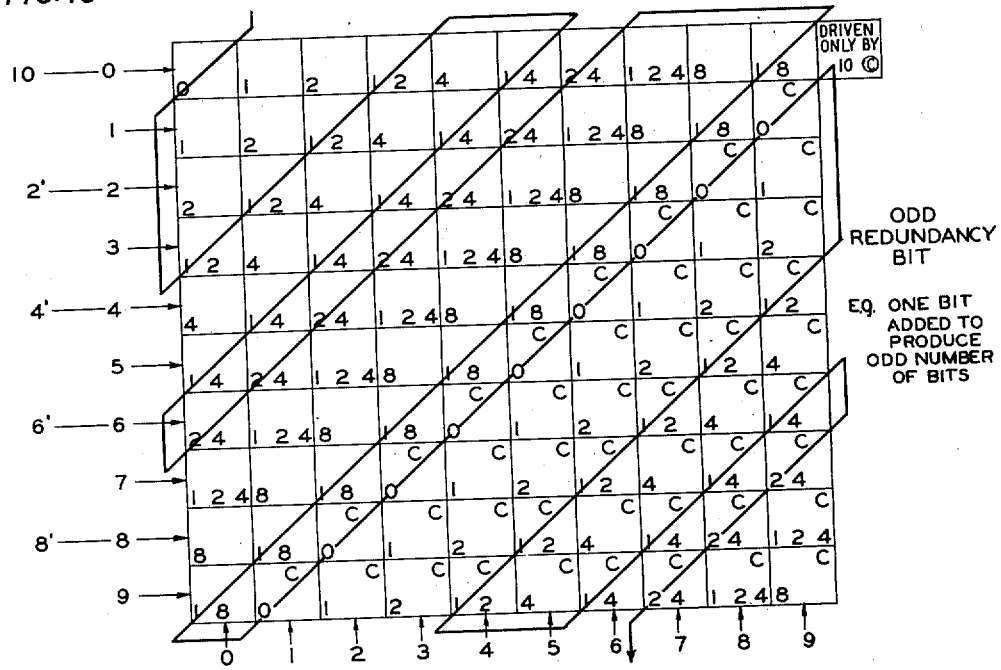
Figure 20:
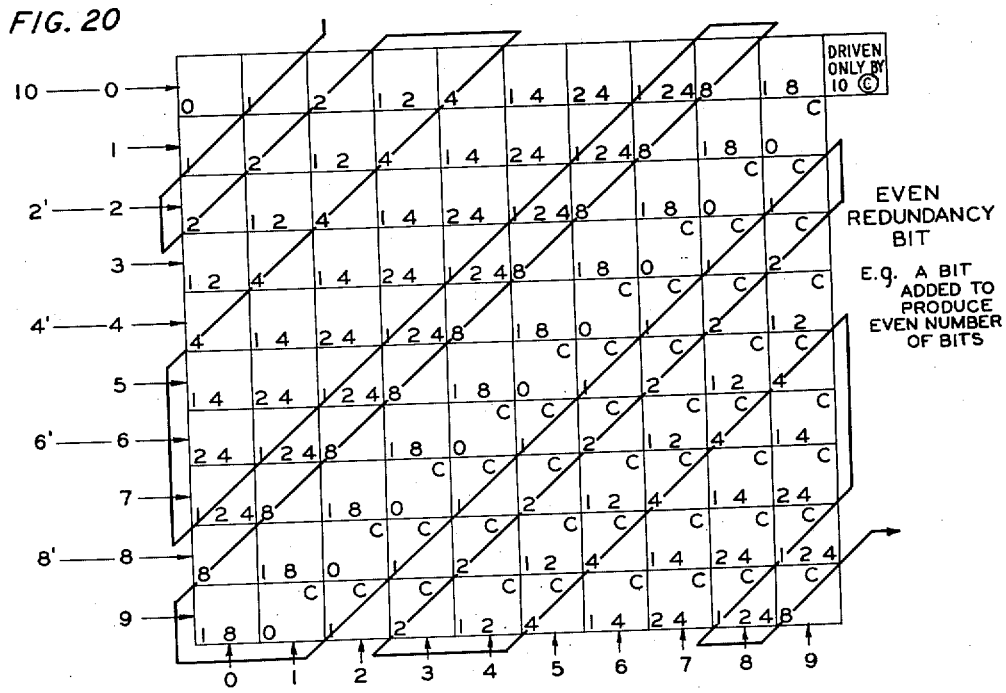
Figure 21:
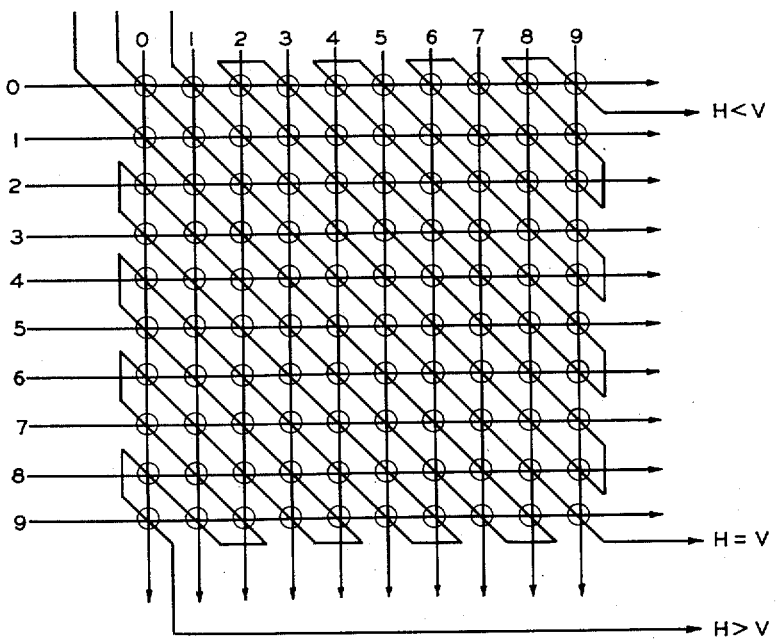
Figure 22:
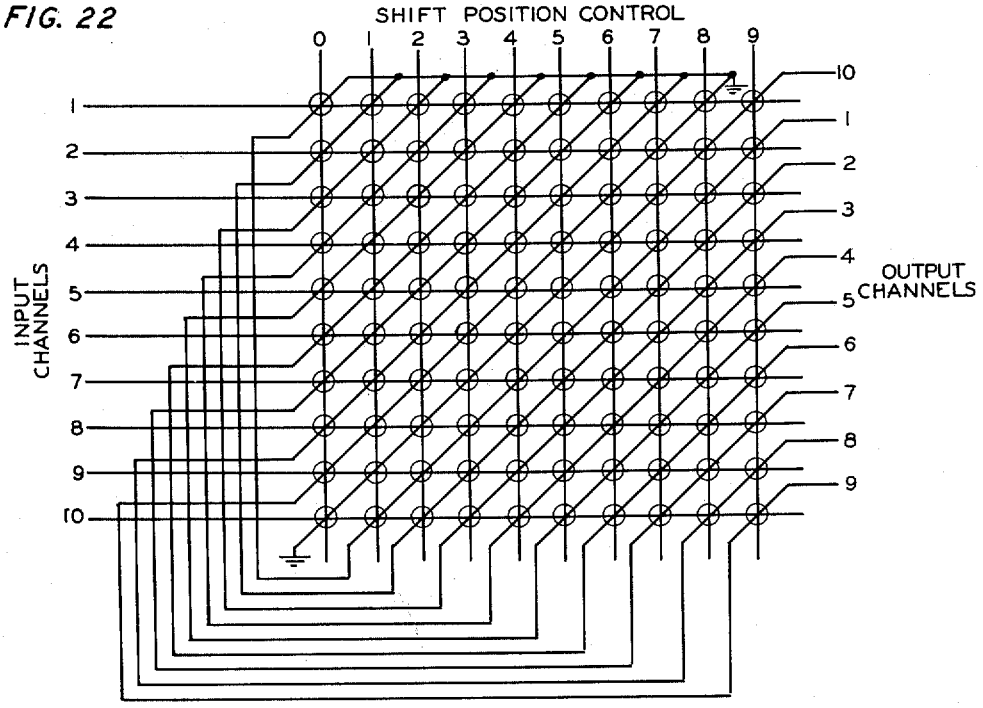

FIG. 10 is a logical circuit diagram showing the means by which the incoming 8, 4 and 2 bits are translated into a single intermediate output signal of the value 0, 2, 4, 6 or 8 used as inputs to the switching matrix such as that of FIG. 8 and that of FIG. 9;

FIG. 11 is a schematic circuit diagram, partly in block form to show the complete operation of the device when used for the purposes of addition;

FIG. 12 is a timing chart, used particularly for the explanation of the circuitry of FIG. 11;

FIG. 13 is a fragmentary schematic circuit diagram showing in more detail certain of the components and connections set forth in FIG. 11;

FIG. 14 is a fragmentary schematic diagram showing a single binary with the input and output wires threaded therethrough for purposes of multiplication;

FIG. 15 is a representation of a matrix of magnetic binaries used for addition and showing the inputs and outputs threaded therethrough and arranged for coded output;

FIG. 16 is another block representation of the same matrix only in the form of a number of squares in each of which the decimal values of the outputs are placed, the units digit at the bottom and the carry or tens digit of the particular sum at the top;

FIG. 17 is a block representation of a matrix of magnetic binaries similar to FIG. 16, but in which the outputs are expressed in the 1, 2, 4 and 8 bit codes and in which the carry output, actually a 1 bit is expressed as C;

FIG. 18 is a similar representation of a matrix for multiplication in which the product values for each binary are expressed in the 1, 2, 4 and 8 bit code, the units digit or right hand component of the product being in the bottom of the box and the tens digit or the left hand component of the product being in the top of the box;

FIG. 19 is a similar representation of a matrix for addition in which the 1, 2, 4 and 8 bit code wires and an odd redundancy bit output wire are shown as threaded through these binaries having an even number of bit outputs in each of its units digit outputs whereby the output code will invariably have an odd number of bits;

FIG. 20 is a similar diagram showing an even redundancy bit output threaded through those binaries having an odd number of bits in its output for its units digit output code whereby the output code will invariably have an even number of bits;

FIG. 21 is another matrix representation showing three output conductors threaded through the binaries to produce comparative value indication, one to show that $H<V$, another to show that $H=V$ and another to show that $H>V$; and FIG. 22 is a matrix representation showing how a matrix may be used as a column shift device.

In order to have a clear understanding of the operation of the devices of the present invention it will be helpful to have a general understanding of certain arrangements and certain terminology commonly used in the general area in which the present circuits are employed. Many of the components and the methods of operation are conventional. By way of example, the following prior art publications and patent applications are incorporated herein as part of this application as though they were fully set forth in the body of this specification.

Application Serial Number 510,403, filed May 23, 1955, now Patent No. 2,845,224, entitled "Core Matrix Card Sensing Means" by F. M. Demer.

Application Serial Number 338,122, filed February 20, 1953, now Patent No. 2,938,668, entitled "Serial-Parallel Binary-Decimal Adder" by Byron L. Havens and Charles R. Borders.

Patent 2,658,681, issued November 10, 1952 to Palmer et al.

Patent 2,584,811, issued February 5, 1952 to B. E. Phelps.

A magnetic binary is a core of magnetic material having such high retentivity that its hysteresis curve is substantially rectangular. It is therefore said to be a bistable magnetic element, for if driven magnetically and substantially to saturation in one direction it will become stable and will remain indefinitely in that state, until by sufficient force applied in the opposite direction it may be driven magnetically and substantially to saturation in such opposite direction. Due to the steepness of its hysteresis curve the transition from one state to the other is very fast and in the transition will produce, in a coil interlinked therewith, a sharp and useful output signal of one polarity or the other depending on the direction of the transition. Such a bistable magnetic core is known commonly as a magnetic binary since it has two stable states which may correspond to the two digits 0 and 1 used in the binary system of arithmetic.

A bit is a binary item, that is, a signal indicating a 1 in the binary code of 0 and 1. The four consecutive binary orders, reading from right to left, represent the decimal digits 1, 2, 4 and 8 and the sum of these values as represented by the bits expressed in any binary code equals the value of the decimal digit represented thereby. A bit is therefore a single binary item in a code which is used to express or convey a given amount of information.

The binary-decimal system is one in which the decimal digits of a number are each separately expressed in a pure binary code. Thus a code 1001, having an 8 bit and a 1 bit, expresses the decimal digit 9. It will appear hereinafter that any other number, higher in value than 9 will be expressed by more than one such binary code, that is a separate binary code for each digit, as for example, 0100, 0101, 1001 for the decimal number 459.

Up and Down refer to potentials. In this electronic maze, each component, such for instance as a tube circuit, is arranged to be active when the potential on its control conductor is Up and inactive when such potential is Down. Generally, as in a cathode follower circuit, when the potential on an input terminal is Up the potential on the output terminal is Up and likewise when the potential on an input terminal is Down the potential on the output terminal is Down. It may be stated, merely by way of example, that a potential of plus 5 volts or more will constitute an Up condition and a potential of minus 30 volts or less will constitute a Down condition. Up means that the voltage present at a particular point is positive with respect to ground and Down means that the voltage present is negative with respect to ground. If the control grid of a vacuum tube is referred to as Down, it means that the voltage at that control grid is below the cutoff value of the vacuum tube.

Numerous coincidence circuits are employed herein. An AND circuit refers to a circuit which is operable to produce an Up condition on its output terminal only when all of its input terminals are Up. An OR circuit refers to a circuit operable to produce an Up condition on its output terminal when any one or another or more of its input terminals are Up.

In the logical diagrams included in the schematic circuit diagrams herein an AND circuit is shown as a rectangle containing the desingation AND, and an OR circuit likewise is shown as a rectangle containing the designation OR.

A cathode follower circuit is a tube circuit having its anode firmly tied to a positive potential source or otherwise arranged so that the grid constitutes an input and the cathode or the cathode circuit constitutes an output. When the grid is Up, the cathode will go Up and when the grid is Down the cathode will go Down. The cathode follower is used mainly to fortify the output of another circuit and to provide a full strength output signal particularly where the original output signal might not have been of sufficient strength for the purposes desired.

A driver is a simple triode having its cathode connected to ground and its anode connected through a load resistor to a source of positive potential. When inactive, its anode is at a high potential substantially at the potential of said source and an output conductor connected to this anode is therefore Up. When the grid of this tube is driven Up, then the anode goes Down, substantially to ground potential. Therefore if the distant end of such an output conductor is connected to a source of positive potential, substantially that of the anode when the grid of the tube is Down there will be no current flow in the ouput. However when the grid is driven Up and the anode goes Down there will be a current flow produced in the said output conductor.

A trigger or a flip-flop is a conventional electronic bistable circuit, and as used herein, having a single input and two outputs. One output is always Up and the other is Down. When an input signal arrives this condition is reversed and when another input signal arrives this condition is again reversed. Thus the flip-flop is a scale of two device. It may be reset at any time to a "normal" condition where a particular one of its outputs (which may be designated 0) is Up and the other (which may be designated 1) is Down. Thus a flip-flop terminating a circuit over which binary bits are transmitted may show the even or odd number of bits it has received.

Figure 1:
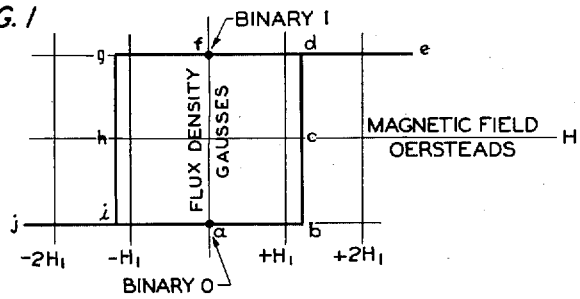
FIG. 1 is an idealized representation of a hysteresis curve of the magnetic material used in the bistable magnetic elements of the present invention.

The bistable magnetic core or the magnetic binary is represented in FIG. 1 by an idealized drawing of its hysteresis loop. The core consists of known and commercially available magnetic material, spoken of as square loop material and which is stable at either of two points of remanence, indicated in the drawing by the heavy dots at point a and f and marked binary 0 and binary 1 respectively. If the core has been driven to point a, binary 0, it will remain in such state indefinitely. If by any means, such as through a winding cooperatively associated therewith, it is energized by a magnetomotive force of $-H_1$ or $-2H_1$, its state will not be changed but on relaxation will return to point a. If it is energized by a magnetomotive force of $+H_1$, insufficient to reach the knee b of the curve, then on relaxation of this force it will likewise return to the point a. If, however, a force of $+2H_1$ is applied, then thec urve abcde will be traced and on relaxation of the force the material will revert to the state f, binary 1, from which it may be dislodged only by a force of something more than $-H_1$ whereby the knee g of the curve may be passed. Such magnetic binaries are tiny, may be stacked in compact arrays, and will remain in one or the other of their states of remanence indefinitely.

Figure 2:
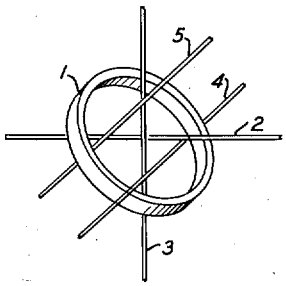
FIG. 2 is a schematic representation of a magnetic binary, being a perspective view of a ring or torus, a preferred form, having a plurality of conductors for input and output circuits threaded therethrough.

Such a magnetic binary is represented in FIG. 2, very greatly enlarged, as a ring or preferably a torus having a plurality or conductors threaded therethrough.

If, by way of example, a pulse sufficient to drive the core 1 to the field strength $+H_1$ is passed through an input 2 and in coincidence therewith a similar pulse is passed through the input 3, this magnetic binary 1 will be driven from its normal binary 0 state to its binary 1 state. As the magnetic field passes along the curve bcd an output pulse will be induced in an output circuit 4. Actually, a similar output pulse will be induced in the output circuit 5, but the circuitry in which these two outputs are employed are so arranged that the pulse in the output 4 alone is effective. Thereafter, coincident reverse pulses in circuits 2 and 3 will drive the binary 1 from its binary 1 state to its binary 0 state and here again as the magnetic field passes along the curve ghi, output pulses will be induced in the output circuits 4 and 5, but in this instance and in accordance with the circuitry provided, the pulse in conductor 4 will be ineffective and the pulse in conductor 5 will be effective.

As it will appear hereinafter, if the input 2 wire is characterized by the decimal value 6 and the input wire 3 is characterized by the decimal value 8, the binary 1 may be characterized by the decimal value 14, the output 4 carrying a units output value 4 and the output 5 carrying a carry 1 or a tens output value 1 and since these two outputs are separated in time, one on the operation of the binary and the other on the restoration thereof, the output 14 may be recorded as a two digit number.

It may likewise be pointed out that if this binary is being used in a multiplying matrix it would represent the product 48 and the output wire 4 would act to transmit the units digit 8 while the output wire 5 would thereafter act to transmit the tens digit 4.

It may further be pointed out that if this binary were used in a summing matrix for binary numbers and both the inputs 2 and 3 represented the input of binary 1 that then the core 1 would represent the binary sum 10 and the output 4 would first transmit the lower order binary digit 0 and the output 5 would thereafter transmit the higher order binary digit 1.

Once again, and further by way of example, if this core 1 were being employed in a summing matrix for duo-decimal arithmetic and the input 2 represented the value 11, while the input 3 represented the value 4, then the output 4 would transmit a low order output of value 3 whereas the output 5 would transmit a higher order output of value 1. Thus by way of example, the binary core 1 could be employed to sum 11 pence and 4 pence and would produce the correct sum 1 shilling and 3 pence.

Figure 3:
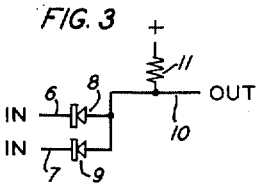
FIG. 3 is a fragmentary schematic circuit diagram of an AND circuit.

In the operation of the devices of the present invention a number of logical and electronic circuits are employed. FIG. 3 shows the essential elements of an AND circuit in which the two inputs 6 and 7 shown are connected to circuits which are normally Down. Due to the poling of the diodes 8 and 9, the output 10 also connected to the load resistor 11 will remain Down until both inputs 6 and 7 have been driven Up. The AND circuit is characterized by its load resistor connected to a source of positive potential and the connection of the cathodes of its input diodes or junction rectifiers being connected to the input wires.

Figure 4:
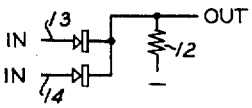
FIG. 4 is a fragmentary schematic circuit diagram of an OR circuit.

FIG. 4 shows an Or circuit, normally maintaining a Down output. In this case the load resistor 12 is connected to a source of negative potential or to ground potential. The two inputs 13 and 14 are normally Down, but since in this case the cathodes of the input diodes are connected to the output wire 15 any one or more of the inputs going Up will drive the output 15 Up.

Figure 5:
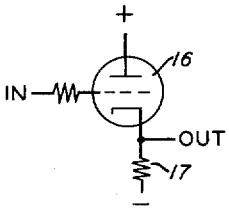
FIG. 5 is a fragmentary schematic circuit diagram of a CF circuit.

A cathode follower, in its essentials is shown in FIG. 5. Here a tube 16, has its anode firmly tied to a source of positive potential whereas its cathode is connected to a source of negative potential through a load resistor 17, the output being connected to the cathode. When the input, connected to the grid, goes Up, then the output goes Up. Generally the tube of the cathode follower is always in a state of conduction but the potential on the output is regulated to be Up or Down in accordance with the state of the input.

Figure 6:
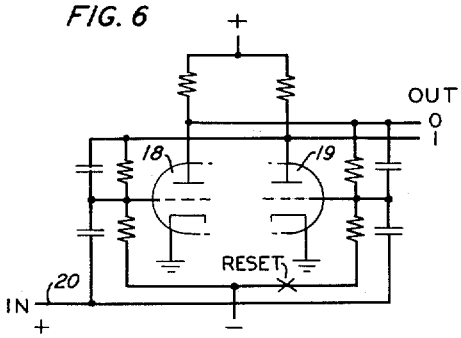
FIG. 6 is a schematic circuit diagram of a trigger circuit commonly spoken of as a flip-flop.

A trigger circuit commonly spoken of as a flip-flop is shown in conventional form in FIG. 6. It is explained in several prior art patents such as the Phelps Patent 2,584,811 and the Palmer et al. Patent 2,658,681. In this circuit either the tube 18 or 19 is normally conducting and this condition is maintained until another pulse is transmitted into the input 20. In the connection between a source of negative potential and the grid of the tube 19 there is a means for opening this connection, marked reset, and when this connection is thus opened temporarily the tube 19 will become conductive so that this condition is looked upon as normal. Since the tube 19 is then operative its anode will be Down and hence the output 1 will be Down and the output 0 will be Up. Where this trigger is used to terminate the incoming code bit lines, the trigger will thus report a zero value, but when an incoming bit is received on input 20, the conditions will be reversed, the tube 18 will become conductive, the tube 19 will be quenched and the trigger will thereupon report a value 1. It may be noted that the two outputs 0 and 1 will lead to cathode followers which can supply adequate Up and Down potentials for the logical circuits following.

Figure 7:
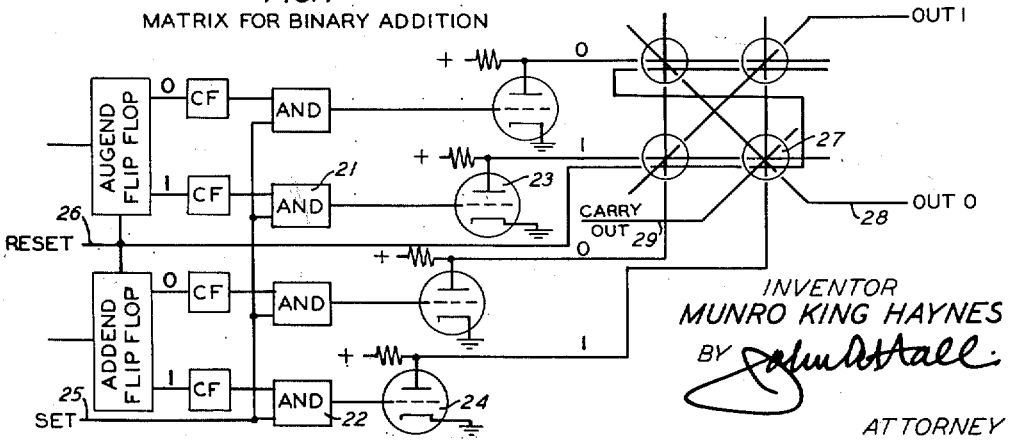
FIG. 7 is a schematic circuit diagram showing a matrix of magnetic binaries arranged for binary addition.

FIG. 7 as labeled, shows a matrix of magnetic binaries for binary addition. There is an augend flip-flop normally holding the 0 CF Up and an addend flip-flop normally holding its 0 CF Up. If coincidentally a bit should be transmitted into each of these flip-flops their 0 output CF would go Down and by the same token their 1 output CF's would go Up. AND circuits 21 and 22 would be enabled so that a setting pulse on conductor 25 would bring the drivers 23 and 24 Up, thus providing coincidence in the circuits threaded through the magnetic binary 27 to drive this to a change in state and this change in state would thereupon cause the transmission of an outgoing pulse on the 0 valued output 28. A pulse would also be transmitted over the carry output 29 but since this output conductor is threaded through the binary 27 in the opposite direction it would constitute an ineffective pulse.

Very shortly thereafter, and as controlled by the timing arrangements hereinafter set forth in detail, a reset pulse will be transmitted over conductor 26 into the two flip-flops and over the resetting conductor common to all the binaries whereby the binary 27 will be restored and in thus changing its state from binary 1 to binary 0 will emit a carry pulse over the carry out 1 conductor. Thus the output conductor 28 was first pulsed and thereafter the output conductor 29 was pulsed producing the binary output sum 10. Thus, in binary addition, $1+1=10$.

It will appear hereinafter that additional circuitry is necessary even for a binary adder when multidigit binary numbers are fed into the flip-flops. Thus to sum 10101 and 11111 to produce 110100 will require provision for mixing the carry produced on the output conductor 29 into some matrix entry such as into an addend input, FIG. 7, however, will serve to indicate the fundamental operation of the present device where a selected binary is operated by the coincident Up pulses on its two inputs and produces a low order output and is thereafter restored to produce a next higher order output.

FIG. 8 is a simple schematic circuit diagram showing how a particular binary of a matrix of switching binaries may be selectively operated by inhibition means. Let us assume that a 1 bit has been entered over the input wire 30 into the flip-flop 31 and that the CF 32 is Up. Then an inhibit pulse, of long enough duration to blanket a read pulse, will be transmitted over the inhibit conductor and since both inputs 34 and 35 of the AND circuit are Up, this signal will pass through the Or circuit having inputs 36 and 37 to the drive 33 and thus provide an input 38 of a switching core matrix and will thereby place each of the binaries 39, 40 and 41 in such condition that no one will respond to an operating pulse. Suppose that during this inhibit pulse a read pulse is applied to an input wire 42, sufficiently strong to operate any uninhibited binary through which it is threaded, then it will be clear that the binary 43 will be operated and that the binary 40 will remain unoperated. The operation of the binary 43 will produce an input pulse for the principal computing matrix as will more clearly appear hereinafter.

Thereafter a reset pulse will be transmitted and this will pass through both of the Or circuits to operate both the drivers 33 and 44 to thus apply a reset potential to all the binaries 39, 40, 41, 43 and so on so that any one which had previously been driven to its binary 1 state would be returned to its binary 0 state. Thus the binary 43 will be restored and in changing to its binary 0 state will provide a reverse current pulse to the input to the principal computing matrix for the purpose of restoring the previously operated binary therein.

FIG. 9 is a schematic circuit diagram showing how an incoming 1 bit may be combined with an incoming carry in an inhibiting circuit for controlling a matrix of switching cores to produce output signals on some one of the eleven outputs thereof (the outputs 2′, 4′, 6′ and 8′ being connected to and acting in the same capacity with the outputs 2, 4, 6, and 8 respectively, as indicated in FIG. 11) to be applied to the inputs of a computing matrix. Since, as will more fully appear hereinafter, the five intermediate values derived from the 8, 4 and 2 bits of an incoming digit will have to be modified in accordance with the three different values derived from the incoming 1 bit and the incoming carry bit this switching matrix will have three rows of five binaries each.

Let us first assume that there is neither an incoming 1 bit nor an incoming carry. In that case both flip-flop 45 and the flip-flop 46 will be in their normal conditions so that CF 47 and CF 48 will be Up. In that case it will appear that the inhibit signal will produce coincidence in the AND circuits 49, 50 and 51 and the Up conditions thus produced will pass through the OR circuits 52 and 53 thus producing an inhibiting signal on that row of binaries having outputs marked 2′, 4′, 6′, 8′ and 10 and that row of binaries marked 1, 3, 5, 7 and 9. Hence the bottom row of binaries having outputs marked 0, 2, 4, 6 and 8 will be uninhibited so that if a signal comes in on the (vertical) input marked 6 a switching pulse will be transmitted over the output marked 6. Likewise, if there is both an incoming bit and an incoming carry it will appear that the top row of switching binaries will be uninhibited and the other two rows will be inhibited so that if the vertical input 6 carries a signal then the top row binary having an output marked 8′ will be operated.

As with the circuit of FIG. 8 it will further appear that shortly thereafter the reset signal will pass all of the OR circuits and thus drive any one of the switching matrix binaries which has been operated to its binary 1 state back to its binary 0 state and thus provide a recoincident restoration of the computing matrix for the coincident restoration of the operated binary therein.

Details of the resetting of the flip-flops 45 and 46 will be given hereinafter.

FIG. 10 is a logical circuit diagram showing how a combination of incoming 8, 4 and 2 bits is registered in the flip-flops and then translated to one of the intermediate values 0, 2, 4, 6 or 8. By way of example, if the value 6 is entered the flip-flops 55 and 56 will be triggered after which it will appear that the CF's 57, 58 and 59 will be UP so that coincidence is produced in AND circuit 60 when the Read pulse is transmitted and thus a signal will be transmitted over the 6 output 61.

FIG. 11 is a schematic circuit diagram which will serve along with the timing chart of FIG. 12 to explain in detail the operations upon the entry of the augend value 8 and the addend value 6 and by similarity the subsequent entry of the augend value 3 and the addend value 9 whereby when the addend 96 is added to the augend 38 the sum 134 will be derived. In FIG. 11 the addend 6 is represented as a pair of positive pulses traveling over the 4 and 2 bit input circuits toward the 4 and 2 bit flip-flops 62 and 63 respectively. These signals will trigger these particular flip-flops and prepare the logic network 64, details of which are set forth in FIG. 10 so as to prepare a driver 65, which may be a triode as hereinbefore explained and which will respond when the read pulse is transmitted.

Since no bit is entered over the 1 bit input, the flip-flop 66 will not be triggered and hence the logic network 67, shown in detail in FIG. 9, will, under control of the inhibit pulse, place an inhibiting potential on the output of drivers 68 and 69 so that in the right hand vertical row of the switching binaries 70 an output pulse will be derived only from that binary marked 6 to transmit an input to the sum binary 71.

TIMING OPERATIONS

The operations of the devices of the present invention are controlled by conventional means which cause the emission of certain control pulses in rigid time relation to each other. In general, it should be noted that the operation of the computer dictates that the incoming signals are included in this rigid time control whereby the computing cycle may be carried out in proper order. Thus soon after the incoming bits have been recorded in the incoming triggers, the vertical rows of magnetic binaries in the switching matrix which will not be used are energized negatively to inhibit the operation thereof. Next a read pulse is transmitted through the drivers and this causes one binary in the uninhibited row to change its state and this change produces a pulse transmitted into the computing matrix whereby a result binary will be driven to a change in state. This produces an output pulse which may be used to set an output trigger and by a following sample pulse the set output trigger may be employed to record this units digit of the computed result. It will be noted that the sample read pulse supplied by the pulse or timing source is comparatively small in time duration, that the read pulse is slightly longer so as to be in effect both before and after the sample pulse and that likewise the inhibit pulse blankets both the sample and the read pulses. When the read pulse is transmitted the switching binary and almost immediately the computing result binary will be driven to a change in state so that the output triggers will be set just prior to the sample read pulse. Thereafter a reset pulse for resetting the carry trigger is sent so as to prepare the carry trigger for operation and this is followed by a reset pulse to the switching cores, and incidentally to the incoming bit flip-flops. This reset pulse in the switching cores is transmitted to all the switching cores and will result in restoring the one core which has been operated. This will produce a negative output pulse, so that the coincidence of two such negative pulses in the one computing result core which has been operated causes the restoration thereof. The main result of this is the transmission of a carry pulse and since the sample carry pulse is transmitted simultaneously with the reset pulse the two will be combined in an AND circuit to operate the carry trigger which will then remain operated until the reset carry pulse is again transmitted so that it will be present when the next set of code pulses are received. The carry pulse is not transmitted to the output, except in the next cycle where it is mixed in with the next digit or when it appears alone in a cycle beyond the computation with the last or highest order digits entered.

In FIG. 12 the incoming code bit entry time is shown as occurring in the second interval. It may be noted that the arrangement of intervals in this timing chart is by way of example and is used herein to explain the sequence of operations rather than to represent the operations of the computer in which this matrix may be employed and the number of intervals and the comparative length of the pulses may be changed to suit other conditions obtaining in the complete device, only the sequence of operations hereby shown being retained.

It may further be noted that in this timing chart, the inhibit pulse, the read pulse, the read output sample pulse, the reset carry pulse, the reset timing for resetting the flip-flops and the sample carry pulse are signals emitted from conventional timing means, such as machines or such devices as electronic commutators.

Thus the triggers 62 and 63 will be set in interval 2, and the inhibit pulse will be transmitted during intervals 3 to 7 inclusive. Hence when the read pulse is transmitted at the beginning of interval 4, the uninhibited switching binary in the right hand vertical row of the switching binaries 70, marked 6 will be driven from its normal binary 0 state to its binary 1 state and will thus transmit an impulse over the 6 output which constitutes the 6 valued input threaded through the binary 71.

It will be apparent that the augend input 8 will be translated by the logic networks 72 and 73 and the switching matrix into an 8 valued input threaded through the binary 71 and that thus the binary representing the sum 14 will be driven by coincidence from its normal binary 0 state to its binary 1 state.

The operation of binary 71 will transmit an output over its units digit output and will register this as shown here schematically in an output trigger 75 for conventional disposition under control of the sample pulse.

It will be shown hereinafter that the output of the binary 71 actually leads through a pulse transformer and thence into an input tube of an amplifier, whereby only positive output pulses may be registered. Thus an immediately following negative pulse produced when the binary 71 is restored is without effect in the trigger 75.

It may now be seen from the timing chart before the binary 71 is to be restored that a carry reset pulse is transmitted to prepare the carry trigger 76 to respond to a carry. Thereafter at the beginning of interval 9 the reset signal, which may take the form of a circuit opening as indicated in FIGURE 6 to restore all the triggers to their normal conditions, and which may take the form of the application of an inhibiting potential to restore any operated switching binary is transmitted. Thereupon by the restoration of the operated switching binaries in the matrix 70 and the matrix 74, coincidence in a negative sense is established in the binary 71 and results in the restoration of binary 71 and the transmission of an effective carry output and an ineffective output toward trigger 75. Since a sample carry pulse is effective at this time, the beginning of interval 9, the AND circuit 77 will be effective and hence the carry input trigger 76 will be operated.

It is now believed to be obvious that in cycle 2, the incoming augend 3 bits, and the combination of the input carry and the incoming addend 9 bits will drive two switching matrix binaries from their normal to their operated states. One of these will produce a signal on the horizontal 10 value input to the computing matrix and the other will produce a signal on the vertical 3 value input to the computing matrix whereby in this instance two computing matrix binaries are operated, the output value 3 binary by coincidence and the output carry 1 value binary by virtue of a double winding of the incoming value 10 conductor threaded therethrough. Thus in cycle 2 an output digit 3 is transmitted for registration.

In cycle 3 there are no input bits but there is a carry which has been registered and hence this will operate a sum binary valued at 01, that is one which will produce a units 1 output and no carry. Hence the addend 96 added to the augend 38 has successively produced the outputs 4, 3 and 1 representing the sum 134.

FIG. 13 is a schematic circuit diagram somewhat along the lines of FIG. 11, but containing certain circuit details designed to make clear an understanding of the present invention. Thus the drivers of FIG. 11 such as the driver 65, may consist of the tube 78 whose grid may be worked from the logic network 64 or as more specifically shown from the output 61 of FIG. 10. The tube 78 controls an input circuit to the binaries 79 and 80, selectively controlled from the logic network 67 as shown in FIG. 11, and when the grid of this tube 78 goes up, a current flow is produced in the input conductors threaded therethrough. If the inhibit signal, indicated by the vertical wire through the binary 79, is first established, then the output of the tube 78 will be opposed in the binary 79 and thus a change in state therein is prevented. The uninhibited binary 80, however, will be operated from its normal binary 0 state to its binary 1 state by the signal from tube 78, and as a result a pulse is induced in the closed circuit 82 threaded through the binaries 80 and 81. This pulse in itself is insufficient to drive the binary 81 to a change in state, but when a similar pulse is simultaneously transmitted over the circuit 83 coincidence is established and binary 81 is operated. Upon this operation, a pulse is transmitted over the circuit 84, threading among others, the binary 81 and terminating in a pulse transformer 85 whose output controls an input tube 86 of an amplifier from which an output trigger may be set.

A pulse at this time is also transmitted over the output circuit 87, through the pulse transformer 88 to the amplifier 89 but this is poled to drive the grid of the amplifier tube more negative and hence is ineffective in this carry circuit.

Now, as clearly shown in FIG. 9, the reset signal shortly following will be transmitted to all the binaries of the switching matrix and hence the binary 80 and that one feeding the circuit 83 will be restored and thus a negative coincidence will be established in the binary 81 to restore it to its normal state. In this operation, pulses will again be transmitted over the circuits 84 and 87 but this time the pulse over circuit 84 will be ineffective whereas the pulse over circuit 87 will be effective. At this particular time a sample pulse will be transmitted to the AND circuit 90 so that coincidence will be established therein and the carry trigger 91 will be operated.

FIG. 14 is a fragmentary sketch showing the arrangement used in a multiplication matrix where the output is to be coded in the binary decimal system along with an odd redundancy bit. A simple inspection of this sketch will make it abundantly clear that by coincident signaling over the 9 value multiplicand input and the 4 value multiplier input, the 36 value matrix binary may first be operated or driven to its binary 1 state and thereafter be restored or driven back to its normal binary 0 state. On the operation of this product 36 binary, the units digit output conductors 2 bit and 4 bit and the odd redundancy bit conductor will be pulsed and likewise when the same binary is restored the tens digit output bit conductors 1 bit and 2 bit and the odd redundancy bit conductor will be pulsed.

FIG. 15 is one representation of a summing matrix for a decimal system in which one hundred and one binaries are arranged in ten horizontal rows having eleven binaries in the first row and ten binaries in each of the remaining nine rows and ten vertical rows of ten binaries each and having ten digital valued inputs in each direction, the eleventh binary in the top horizontal row having a value of ten. It will be noted by way of example, in this figure, that one particular binary is shaded by cross hatching. This is the output valued 14 binary which has been described as being operated by coincidence of the horizontal valued 6 input and the vertical valued 8 input. It will further be noted that this particular binary also has threaded therethrough an output 4 bit conductor and an output carry conductor. The matrix of FIG. 15 is thus seen to be arranged to produce coded outputs, as shown in another manner in FIG. 17 and in contradistinction to the simple decimal output arrangement of FIG. 16.

It is to be noted that FIG. 15 is simplified for clarity by the omission of three other like output leads which carry the 1, 2 and 8 bits. This FIG. 15 represents the decimal matrix containing the binary 71 of FIG. 11 driven by the switching matrices 70 and 74. The eleven outputs 0–10 inclusive of the matrix 70 become the eleven horizontal wires 0–10 inclusive and the ten outputs of the switching matrix 74 become the ten vertical wires 0–9 inclusive of this matrix FIG. 15. Only the 4 bit output and the carry output wires are shown.

As it has been explained hereinbefore and as it may be seen from FIGURES 9 and 11, a ten valued output may at times be produced, by the entry of a nine in the addend input register and the simultaneous entry of a carry. For the purpose of disposing of this, which is nothing more nor less than a carry, an extra binary is provided and the conductor for the transmission of a bit thus generated is threaded through the same binaries as the zero value and then given a double winding on this extra binary since it is not operated by coincidence in the normal manner but only by a double exposure to the single signal on the value 10 input.

FIG. 16 is another representation of a decimal system summing matrix wherein the comparative location of the various binaries is laid out in a coordinate box arrangement. Each box has shown therein the decimal sum value of its output, the units digit at the bottom of the box and the tens digit at the top of the box (excepting where the tens digit is 0).

FIG. 17 is the equivalent of FIG. 16 excepting that the outputs are coded as in FIG. 15 and the carries being all of one value are denoted by the letter C.

FIG. 18 shows a matrix used for multiplication as explained with relation to FIG. 14. In this case the outputs are coded to be transmitted over a units four bit output channel and a tens four bit output channel.

FIG. 19 shows a summing matrix with an odd redundancy bit output threaded through all those binaries arranged to transmit an even number of output bits for conventional purposes and FIG. 20 is a similar showing of an even redundancy bit output.

FIG. 21 is a decimal matrix having three value comparison circuits threaded through the binaries to produce one of the three indications H<V, H=V, or H>V. Indications of this nature are necessary and useful in business machine working as set forth more fully in the said Demer application Serial Number 510,403, filed May 23, 1955.

FIG. 22 is a matrix used for column shifting. A simple inspection will show, by way of example, that a bit incoming on input channel 5 by coincidence with a signal on control conductor 3 may be made to appear on output circuit 8, being thus shifted three positions. The bits on the input channels are shifted one at a time, but the operation is extremely rapid and the present device is comparable to if indeed not an improvement over the column shift means disclosed in the R. L. Palmer et al. Patent 2,658,681. In this arrangement, as shown, the incoming horizontal conductors each have a different digital value and the vertical control conductors likewise have a different digital value. The outputs are numbered to correspond to the inputs and are each threaded through those binaries identified by a digital value corresponding to the sum of the values of the input and the control conductor. Thus in one instance where the input is 1 and the column shift control is 3, the output will be 4, that is if a bit is present in column 1 it will be shifted to column 4. Again, when the input is 8 and the control is 3, the output will be 1, that is the units value of the sum 11 and a bit present in column 8 will be shifted to output column 1.

In a shifting operation, the inputs 1 to 10 are successively enabled whereas a single control is successively and coincidentally pulsed so that any item of information is shifted uniformly. A column shift matrix may have as many horizontal inputs and outputs as there are in the codes (sometimes as many as 66) and as many vertical inputs as there are positions to be shifted.

What is claimed is:

1. In a data handling device, a matrix of magnetic binaries, having threaded therethrough in each row in one coordinate direction, a different value input conductor for a first factor and likewise threaded therethrough in each row in another coordinate direction a different value input conductor for another factor, means responsive to coincident signals on two of said input conductors, one in each said factor group, for selectively operating one of said binaries, means for following said signals with reverse current signals for restoring said operated binary and output circuit conductors threaded through each of said binaries, certain of said output conductors being threaded through said binaries in one direction to transmit output pulses on the operation of each said binary and the remainder thereof being threaded through said binaries in the opposite direction to transmit output pulses on the restoration of each said binary to express an expected data handling result.

2. In a data handling device, a matrix of magnetic binaries, having threaded therethrough in each row in one coordinate direction, a different value input conductor for a first factor and likewise threaded therethrough in each row in another coordinate direction a different value input conductor for another factor, means responsive to coincident signals on two of said input conductors, one in each said factor group, for selectively operating one of said binaries, means for following said signals with reverse current signals for restoring said operated binary, output circuits operated by said binaries, certain of said output circuits being threaded through said binaries in one direction to be effective on the operation thereof to transmit a first order output signal and the remainder thereof being threaded through said binaries in the opposite direction to be effective on the restoration thereof to transmit a second order output signal.

3. In a data handling device for performing operations with a pair of quantities expressed in a given system of numbering, comprising a matrix of magnetic binaries coordinately arranged in rows equal in number to the base of said system of numbering, each row in each coordinate direction having threaded therethrough an input circuit for a different digit of said system of numbering, means for coincidentally and selectively transmitting an operating pulse through a selected input circuit in each coordinate direction for operating a single one of said binaries and means for thereafter transmitting a restoration pulse through said selected input circuits for restoring said operated binary, a pair of output circuits threaded through each said binary whose inputs are such as to produce a two digit result, said output circuits being responsive to the operation and the restoration thereof for transmitting a pair of output signals, one representing a low order digit of the result of said handling and another representing a higher order digit thereof.

4. In a data handling device for performing operations with a pair of quantities expressed in a given system of numbering, comprising a matrix of magnetic binaries arranged in rows equal in number to the base of said system of numbering, each row in each coordinate direction having threaded therethrough an input circuit for a different digit of said system of numbering, means for coincidentally and selectively transmitting an operating pulse through a given circuit in each coordinate direction for operating a single one of said binaries representing the result of combining the values represented by said incoming circutis and means for thereafter transmitting a restoration pulse through said incoming circuits for restoring said operated binary, output circuits threaded through each said binary, one or more thereof representing the bits of a code for an output digit and being poled to transmit bit signals representing a low order digit of the result represented by said binary on the operation of said binary and other of said output circuits being oppositely poled to transmit bit signals representing a higher order digit of the said result on the restoration of said binary.

5. In a data handling device, a matrix of magnetic binaries having threaded therethrough in each row in one coordinate direction, a different value input conductor for a first factor and likewise threaded therethrough in each row in another coordinate direction a different value input conductor for another factor, means for translating code bits of incoming factor digits into signals for transmission over said different value input conductors, comprising a set of triggers, one for each incoming bit, a logical circuit network having a first plurality of output circuits and, for deriving a single outgoing signal on one of said output circuits from a plurality of said triggers in correspondence with the combinational value of said bits, a matrix of switching magnetic binaries coordinately arranged with one of said logical circuit outputs threaded through the binaries of one row thereof in one coordinate direction, an inhibiting circuit controlled by one of said triggers having a second plurality of output circuits each threaded through a row of said switching binaries in another coordinate direction, means for transmitting from said inhibiting circuit an inhibiting signal on all exceptng one of said second plurality of output circuits, a plurality of output circuits from said switching matrix constituting said input circuits to said first matrix of magnetic binaries and means operative during the transmission of said inhibiting signals for transmitting an operating signal over one of said logical circuit network outputs to operate a corresponding one of said binaries in said [unhibited] *uninhibited* row of binaries to produce a single matrix output signal corresponding in value to the combinational value of all said incoming code bits.

6. In a data handling device, a matrix of magnetic binaries having threaded therethrough in each row in one coordinate direction, a different value input conductor for a first factor and likewise threaded therethrough in each row in another coordinate direction a different value input conductor for another factor, means for translating code bits of incoming factor digits into signals for transmission over said different value input conductors, comprising a set of triggers, one for each incoming bit, a logical circuit network having a plurality of output circuits and for deriving a single outgoing signal on one of said output circuits from a plurality of said triggers in correspondence with the combinational value of said bits, a matrix of switching binaries coordinately arranged with each of said logical circuit outputs threaded through the binaries of one row thereof in one coordinate direction, an inhibiting circuit jointly controlled by one of said triggers and a trigger responsive to a carry signal from said matrix of magnetic binaries, said inhibiting circuit having a plurality of output circuits each threaded through a row of the binaries of said switching magnetic binaries in another coordinate direction, means for transmitting from said inhibiting circuit an inhibiting signal on all excepting one of said inhibiting circuit output circuits, a plurality of output circuits from said switching matrix constituting said input circuits to said first matrix and means operative during the transmission of said inhibiting signals for transmitting an operating signal over one of said logical circuit network outputs to operate a corresponding one of said binaries in said uninhibited row of binaries to produce a single matrix output signal corresponding in value to the combinational value of all said incoming code bits.

7. In a summing device, a matrix of magnetic binaries having threaded therethrough in each row in one coordinate direction, a different value input conductor for an augend and likewise threaded therethrough in each row in another coordinate direction a different value input conductor for an addend, means responsive to coincident augend and addend signals for selectively operating one of said binaries, means for following said signals with reverse current signals for restoring said operated binary, output circuits operated by said binaries, one being threaded through said binary in one direction to be effective on the operation thereof to transmit a low order output sum signal and another being threaded through said binary in the opposite direction to be effective on the restoration thereof to transmit a next higher order output sum signal.

8. In a multiplying device, a matrix of magnetic binaries having threaded therethrough in each row in one coordinate direction a different value input conductor for a multiplicand and likewise threaded therethrough in each row in another coordinate direction a different value input conductor for a multiplier, means responsive to coincident multiplicand and multiplier signals for selectively operating one of said binaries, means for following said signals with reverse current signals for restoring said operated binary, output circuits operated by said binaries, one being threaded through said binaries in one direction to be effective on the operation thereof to transmit a low order output product signal and another being threaded through said binaries in the opposite direction to be effective on the restoration thereof to transmit a next higher output product signal.

9. In a computing device, a matrix of magnetic binaries having threaded therethrough in each row in one coordinate direction, a different value input conductor for a first factor and likewise threaded therethrough in each row in another coordinate direction a different value input conductor for another factor, means responsive to coincident signals on two of said input conductors, one in each of said factor groups, for selectively operating one of said binaries, means for following said signals with reverse current signals for restoring said operated binary, code bit output circuits operated by said binaries, certain of said output circuits arranged to be effective on the operation thereof to transmit a code of output signals for a first order digit and other of said output circuits arranged to be effective on the restoration thereof to transmit a code of output signals for a next higher order digit and redundancy bit output conductors threaded through said binaries to transmit redundancy bits simultaneously with said output bits.

10. In a computing device, a matrix of magnetic binaries having threaded therethrough in each row in one coordinate direction, a different value input conductor for a first factor and likewise threaded therethrough in each row in another coordinate direction a different value input conductor for another factor, means responsive to coincident signals on two of said input conductors, one in each of said factor groups, for selectively operating one of said binaries, means for following said signals with reverse current signals for restoring said operated binary, code bit output circuits and a redundancy bit output conductor threaded through said binaries having odd numbers of output conductors to transmit redundancy bits simultaneously with said output bits, said output circuits including said odd redundancy bit conductor being effective on the operation of said binaries and a similar set of output and odd redundancy bit conductors arranged to be effective on the restoration of said binaries.

11. In a computing device, a matrix of magnetic binaries having threaded therethrough in each row in one coordinate direction, a different value input conductor for a first factor and likewise threaded therethrough in each row in another coordinate direction a different value input conductor for another factor, means responsive to coincident signals on two of said input conductors, one in each of said factor groups, for selectively operating one of said binaries, means for following said signals with reverse current signals for restoring said operated binary, code bit output circuits and a redundancy bit output conductor threaded through said binaries having even numbers of output conductors to transmit redundancy bits simultaneously with said output bits, said output circuits including said even redundancy bit conductor being effective on the operation of said binaries and a similar set of output and even redundancy bit conductors arranged to be effective on the restoration of said binaries.

12. In a computing device, a matrix of magnetic binaries having threaded therethrough in each row in one coordinate direction, a different value input conductor for a first factor and likewise threaded therethrough in each row in another coordinate direction a different value input conductor for another factor, means responsive to coincident signals on two of said input conductors, one in each of said factor groups, for selectively operating one of said binaries, means for following said signals with reverse current signals for restoring said operated binary, code bit output circuits operated by said binaries, certain of said output circuits arranged to be effective on the operation thereof to transmit a code of output signals for a first order digit and other of said output circuits arranged to be effective on the restoration thereof to transmit a code of output signals for a next higher order digit and redundancy bit output conductor threaded through said binaries having odd numbers of low order output digit outputs and a redundancy bit output conductor threaded through said binaries having odd numbers of higher order output digit outputs.

13. In a computing device, a matrix of magnetic binaries having threaded therethrough in each row in one coordinate direction, a different value input conductor for a first factor and likewise threaded therethrough in each row in another coordinate direction a different value input conductor for another factor, means responsive to coincident signals on two of said input conductors, one in each of said factor groups, for selectively operating one of said binaries, means for following said signals with reverse current signals for restoring said operated binary, code bit output circuits operated by said binaries, certain of said output circuits arranged to be effective on the operation thereof to transmit a code of output signals for a first order digit and other of said output circuits arranged to be effective on the restoration thereof to transmit a code of output signals for a next higher order digit and redundancy bit outputs to differentiate between odd and even numbers of bits in the output codes for which each of said binaries is arranged, a redundancy bit conductor for each output digit transmitted from said binaries being threaded therethrough and poled to respond to operation and restoration thereof respectively.

14. In a computing device, a matrix of magnetic binaries each representing the arithmetical result derived from a pair of input factors, each said binary having threaded therethrough one set of output conductors for a low order output digit, said conductors being poled to respond to a change in state of said binary in one direction, and another set of output conductors for a higher order output digit, said conductors of said second set being poled to respond to a change in state of said binary in the other direction, means for selectively operating said binaries first in one direction and second in the opposite direction, said output conductors in each said set constituting code bit input circuits for registering output digits and including redundancy code bit circuits.

15. In a computing device, a matrix of magnetic binaries, having threaded therethrough in each row in one coordinate direction, a different value input conductor for a first factor and likewise threaded therethrough in each row in another coordinate direction a different value input conductor for another factor, means responsive to coincident signals on two of said input conductors, one in each of said factor groups, for selectively operating one of said binaries, means for following said signals with reverse current signals for restoring said operated binary, output circuits operated by said binaries, one arranged to be effective on the operation thereof to transmit a first order output signal and another arranged to be effective on the restoration thereof to transmit a carry, and an extra binary provided with an input conductor doubled therethrough and arranged to produce only a carry.

16. In a decimal adder, a matrix of 100 magnetic binaries having threaded therethrough in each of 10 rows in a first coordinate direction a different one of 0 to 9 valued input conductors and likewise threaded therethrough in each row in a second coordinate direction a different one of 0 to 9 valued input conductors, means responsive to coincident signals on two of said input conductors, one in each of said groups for selectively operating one of said binaries characterized by the sum of the values of its said input conductors, means for following said signals with reverse current signals, output circuits threaded through said binaries and having the value of the units digits of said sums and arranged to be effective on the operation of said selected binary, a carry output conductor threaded through all of said binaries having a two digit sum value and arranged ot be effective on the restoration of said selectively operated binary and an extra binary having threaded therethrough but a single input conductor valued at 10 and said output carry conductor, said input conductor being doubly threaded through said extra binary to produce operation thereof over a single input conductor.

17. In a computing device wherein information expressed by a series of coded bits arranged in columnar array is transmitted from place to place, a column shift device consisting of a matrix of magnetic binaries having columnar inputs each threaded through a different row of said binaries in one coordinate direction and each given a different digital value, a plurality of column shift control inputs each threaded through a different row of said binaries in another coordinate direction and each given a different digital value, and a plurality of columnar outputs each shifted in space from the said columnar inputs and each threaded through a plurality of said binaries each of which is identified by a digital value corresponding to the sum of the digital values of its columnar input and its column shift control input, and means for successively transferring a plurality of bits in columnar array to a different columnar array consisting of means for successively enabling said columnar inputs and coincidentally pulsing a given one of said control inputs.

*18. In a data handling device, a matrix of magnetic binaries having threaded therethrough, in each row in one coordinate direction, a different value input conductor for a first factor and likewise threaded therethrough in each row in another coordinate direction a different value input conductor for another factor, means for setting and resetting a selected one of said binaries including means for coincidentally energizing a selected one of said different value input conductors in each coordinate direction, and output circuit means comprising a first group of one or more output windings coupling all the cores of said matrix responsive to only the setting of a selected binary to manifest a first order result of said factors and a second group of one or more output windings coupling only a predetermined number which is less than all of the binaries of said matrix, responsive only to the resetting of a selected binary to manifest a second order result of said factors.*

*19. In a data handling device for performing operations with a pair of quantities expressed in a given system of numbering; a matrix of magnetic binaries coordinately arranged in rows equal in number to the base of said system of numbering; each row in each coordinate direction having threaded therethrough an input circuit for a different digit of said system of numbering; means for both setting and resetting a selected one of said binaries including means for coincidently energizing a selected one of said input circuits in each coordinate direction; and a pair of output circuit means comprising a first group of one or more output windings coupling all the binaries of said matrix responsive to only the setting of a selected binary to manifest a first order result of said pair of quantities and a second group of one or more output windings coupling only a predetermined number which is less than all of the binaries of said matrix, responsive only to the resetting of a selected binary to manifest a second order result of said pair of quantities.*

References Cited in the file of this patent
or the original patent

UNITED STATES PATENTS

| | | |
|---|---|---|
| 2,691,156 | Salz et al. | Oct. 5, 1954 |
| 2,691,157 | Stuart-Williams et al. | Oct. 5, 1954 |
| 2,733,860 | Rajchman | Feb. 7, 1956 |
| 2,733,861 | Rajchman | Feb. 7, 1956 |
| 2,734,187 | Rajchman | Feb. 7, 1956 |
| 2,819,018 | Yetter | Jan. 7, 1958 |
| 2,819,019 | Yetter | Jan. 7, 1958 |
| 2,843,838 | Abbott | July 15, 1958 |
| 2,844,812 | Auerbach | July 22, 1958 |

OTHER REFERENCES

Olsen: "A Magnetic Matrix Switch and Its Incorporation Into a Coincident Current Memory" (Pub. II), M.I.T. Report R-211, dated June 6, 1952, received U.S. Patent Office May 27, 1955.

Gordon et al.: "A High Speed Magnetic Core Output Printer" (Pub. I), Proc. Assoc. for Comp. Mach., September 1952, pp. 6–12 relied on.